United States Patent [19]
Lee

[11] Patent Number: 6,097,397
[45] Date of Patent: Aug. 1, 2000

[54] ANISOTROPIC TEXTURE MAPPING USING SILHOUETTE/FOOTPRINT ANALYSIS IN A COMPUTER IMAGE GENERATION SYSTEM

[75] Inventor: Harry Charles Lee, Maitland, Fla.

[73] Assignee: Real 3D, Inc., Orlando, Fla.

[21] Appl. No.: 08/975,133

[22] Filed: Nov. 20, 1997

[51] Int. Cl.$^7$ .................................................. G06T 11/40
[52] U.S. Cl. .......................................... 345/430; 345/433
[58] Field of Search ....................... 345/418–20, 430–31, 345/433–38, 432

[56] References Cited

U.S. PATENT DOCUMENTS

| | | |
|---|---|---|
| 4,727,365 | 2/1988 | Bunker et al. |
| 4,974,176 | 11/1990 | Buchner et al. |
| 5,287,438 | 2/1994 | Kelleher .................................. 345/432 |
| 5,651,104 | 7/1997 | Cosman .................................. 345/428 |
| 5,831,624 | 11/1998 | Tarolli et al. ............................ 345/430 |

FOREIGN PATENT DOCUMENTS

| | | |
|---|---|---|
| 2 275 402A | 8/1994 | United Kingdom . |
| 2 288 304A | 10/1995 | United Kingdom . |

OTHER PUBLICATIONS

WEB paper "5.4 Anisotropic Texture Filtering", at URL: http://www.sgi.com/software/opengl/advanced98/notes/node37.html.

Torberg, Talisman: Commodity Realtime 3D Graphics for the PC, ACM Siggraph, Aug. 4, 1996, pp. 353–363.

Foley et al., "Introduction to Computer Graphics", Addison–Wesley Publishing Company, pp. 498–501, color plate 34, 1994.

*Primary Examiner*—Mark K. Zimmerman
*Assistant Examiner*—Mano Padmanabhan
*Attorney, Agent, or Firm*—Scully, Scott, Murphy & Presser

[57] ABSTRACT

Anisotropically mapping of texture information to each pixel required for display of each of plural polygons forming each scene on a CIG display in a computational efficient manner, uses the footprint of each transformed pixel silhouette, as mapped from image space into the texture array, to determine an anisotropic texture space area having both a related length and a related width, in which complete texels and texels fractions are covered by that pixel footprint. A set of un-normalized line equations characterizing a particular pixel footprint is used to determine whether each texel or subtexel in the vicinity of that pixel footprint is either enclosed or avoided by (i.e. inside or outside of) that projected pixel footprint.

24 Claims, 4 Drawing Sheets

ANISOTROPIC TEXTURE MAPPING USING SILHOUETTE/FOOTPRINT ANALYSIS IN A COMPUTER IMAGE GENERATION SYSTEM

The present application is directed to a computer image generation (CIG) system, also referred to as a graphics accelerator, for the display of two-dimensional (2D) representations of three-dimensional (3D) scenes and, more particularly, to novel methods and apparatus for mapping texture anisotropically to each display pixel by silhouette analysis of each display space pixel required for each of a plurality of polygons forming each, preferably real-time, scene on a CIG display, in a computational efficient manner.

BACKGROUND OF THE INVENTION

It is now well known to provide a computer image generation system, and associated processes, for generation of 3D image scenes upon a 2D display; each scene may contain many thousands (typically, over one million) of individual picture elements, called pixels, with each pixel having visual attributes unique to that corresponding small visible area in a 2D image space representation of the 3D object space then observable by a viewer situated with a certain orientation relative to the objects. The objects themselves are viewed from a known observation point, and may thus be represented by a set of planar surface polygons, which may be textured, by projection into texture space for convolution with the texture elements (texels) of selected texture patterns, prior to display. The various aspects of a CIG textured-polygon process may be had by reference to available texts and to previous Letters Patent, including U.S. Pat. No. 4,727,365 (Advanced Video Object Generator, issued Feb. 28, 1988) and U.S. Pat. No. 4,974,176 (Microtexture for Close-In Detail, issued Nov. 27, 1990), both of which patents are assigned to the assignee of the present application and are incorporated herein in their entireties by reference, along with all of the references cited therein.

It has been observed that most texture mapping approaches used in real time and with interactive graphic systems can not achieve a quality texture mapping for shallow viewing angles of textured objects (relative to the plane of the object polygon), i.e. where the object to be textured has a high aspect ratio (i.e., with a high angle of viewing incidence, generally greater than 45°, with respect to the polygon normal). An example of this is the "White Line Down the Center of the Road" problem: in the real world, the broken white road line is a series of white line segments each about 10 feet long and 5 inches wide with each white line segment separated by 10 feet of black pavement. Display of a 2D representation of a real 3D white road line would try to achieve two conflicting goals: first, to prevent the white line from disappearing as an observer looks down the road; and second, to prevent the resulting displayed white line from scintillating—here, scintillation is manifest as the appearance and disappearance of different sets (say, 50 feet lengths) of several white-line segments along the road. Another related example of these problems is the change in building features that are sharp when facing the viewer and either scintillate or take on a soft appearance when viewed at a high aspect ratio (shallow angle to the viewer). Most of these problems are caused by a failure to account for the display pixel (which usually has a rectangular, and often square, silhouette in image space) having an elongated footprint when mapped into texture space.

Texture maps are often organized into Level of Detail (LOD) sets. Typically, each coarser-level member of the set is a texture map that is a 2:1 reduction of the nextmost-finer set member above it; thus, a level D texture map will have 4 (or 2×2) texture elements (texels) for each texel in the texture map for the next-coarser level D+1. So, if the finest, first LOD (D=0) map has an array of 512-by-512 texels, the next-coarser LOD (D=1) is a texture map that is made up of an array of 256-by-256 (or 256×256) texels. This process is carried out, for this example, until LOD 9 yields a map with a single 1×1 texel.

In hitherto normal texture-to-pixel mapping, the effective LOD of each pixel is calculated for both of the width and length of that pixel as projected in texture space and the larger of the two effective LOD numbers is selected as that pixel's effective LOD. Next, two texture maps with LODs that bracket the effective LOD of the involved pixel are selected and an interpolation between two adjacent LOD texture maps is performed, using one of 3 interpolation strategies, is performed to calculate the value of the mapped pixel. The three interpolation methods are: nearest neighbor interpolation, bi-linear interpolation, or tri-linear interpolation.

Because the larger of width or length of the modified pixel, as projected in texture space, is used to determine the pixel's effective texture space LOD, the projected pixel effective size is forced to have the same texture space size in both its length and width directions. These texture methods are said to be isotropic because the LOD of the mapped pixel are always the same in both directions in texture space. However, when normally-rectangular (preferably, square) image space pixels are projected onto a object-space polygon which is skewed to some degree with respect to the view axis (itself normal to the image/display space plane), each projected or (texture-) mapped pixel becomes elongated because of the shallow projection angle; if such elongation (the ratio of the greater projected dimension to the lesser projected dimension) is beyond some selected limit (say, 3:1) the well known isotropic procedures, using the fiction that length equals width, can not be accommodated. This is the anisotropic case, where the projected pixel footprint dimensions, and therefore the associated LODs, can not be the same in both directions without causing undesired visual artifacts.

It is highly desirable to provide anisotropic texture methods that account for a projected pixel elongated shape in texture space. Several such methods (usually for non-real-time systems) have been implemented by approaches which fall into one of two broad categories: 1) Methods for convoluting the pixel texture-space-projection with the texture values, for producing very accurate, but computationally very expensive, results; and 2) Methods using the storage of pre-processed and pre-filtered textured maps, which require less computations but are also less flexible and precise, and more memory intensive.

Because of the increasing demand for more and more different textures maps to be available for real-time and interactive systems, the less memory intensive approaches are more desirable. In the past, other schemes for rendering anisotropic texture have been suggested (such as a procedure, used almost a decade ago by our predecessor simulation group, of sampling the texture along only the single greater diagonal of the anisotropic pixel) have hitherto been found to either provide insufficient resolution of the anisotropic texturing problems or be too costly (in terms of either necessary hardware or computational time).

Accordingly, provision of novel methods for mapping texture anisotropically to each display pixel required for each of a plurality of polygons forming each, preferably real-time, scene on a CIG display in a computational efficient manner, is highly desirable.

BRIEF SUMMARY OF THE INVENTION

In accordance with the invention, a method for anisotropically mapping texture information to each pixel required for display of each of plural polygons forming each scene on a CIG display in a computational efficient manner, uses the footprint of each transformed pixel, as mapped into the texture array, to determine an anisotropic texture space area having both a related length and a related width, in which complete texels and texels fractions are covered by that pixel footprint. Use of a set of un-normalized line equations characterizing a particular pixel footprint is used to determine whether each texel in the vicinity of that pixel footprint is either enclosed or avoided by (i.e. inside or outside of) that projected pixel footprint. By use of an isotropic 2D area, rather than a 1D line (which is only proper for very high aspect ratios {typically greater than 70°}), this method allows for tallying of the included full texels or texel fractions, so as to determine the color and/or translucency of the pixel. Since all values are determined incrementally, my methods initially require the computation of a few values, followed by a simple incrementing procedure to tally which texels are included in the footprint and which are not. If the texels are subdivided into 2 or more subtexels, each subtexel can also be determined to be inside or outside of the pixel footprint, permitting more accurate texture mapping. A pixel is mapped into a higher resolution texture map than its effective isotropic LOD would indicate. The projected pixel overlaps a number of texels in all direction.

Accordingly, it is one object of the present invention to provide novel method and apparatus for the anisotropic texturing of image space pixels using an areal projection and silhouette analysis.

This and other objects of the present invention will become apparent to those skilled in the art, upon consideration of the appended drawings and reading of the associated detailed description of a presently preferred embodiment.

DETAILED DESCRIPTION OF A PRESENTLY PROFFERED EMBODIMENT

Figure 1A:
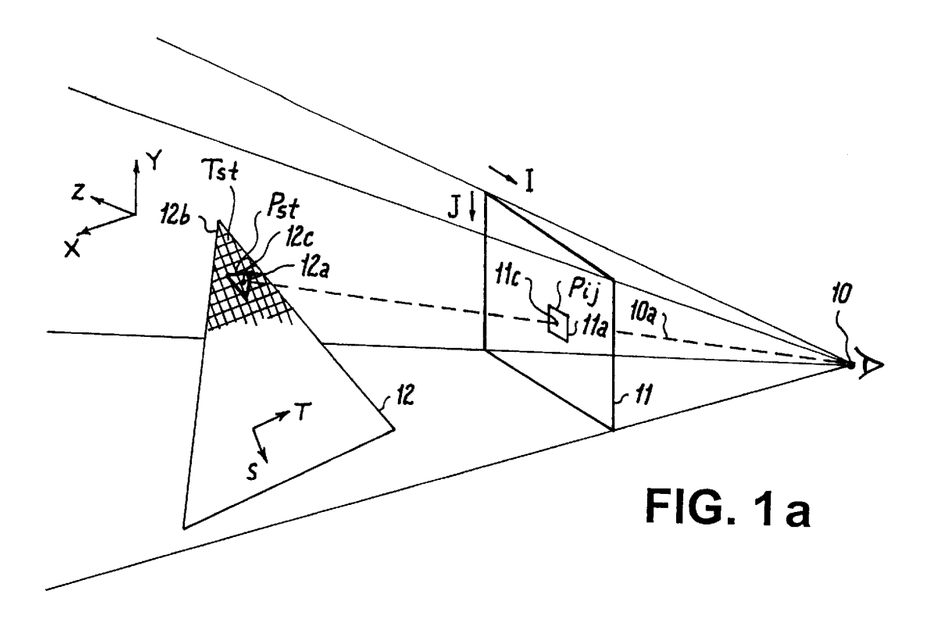
FIG. 1a is an isometric view of an observer frustum viewing a textured polygon through the display screen plane in image space, and useful in appreciating the background of the methods of the present invention.

Referring initially to FIG. 1a, an observer O is at viewpoint 10, viewing a display plane 11 which is the image, or display, space characterized by axes I and J; this plane is made up of an array of display picture elements, or pixels, 11a of which a general array pixel $P_{ij}$ is denominated by its respective I and J axial dimensions. A viewline 10a passes through the center 11c of the pixel 11a silhouette and is projected as the center 12c of a footprint 12a of the pixel 11a as projected onto a plane 12 in texture space. Plane 12 will, in general, be an object-space polygon as projected into texture space and will have an array of texture elements, or texels, 12b thereon; the textured polygon plane 12 has axes S and T, so that a general array texel $T_{st}$ is denominated by its S and T axial dimensions. It will be seen that the generally rectangular, often square, silhouette of pixel 11a will, because the underlying polygon 12 is generally not parallel to the screen plane 11, be projected upon plane 12 as a quadrilateral pixel $P_{st}$ footprint 12a typically having four unequal sides as well as unequal corners which typically are not right angles.

Figure 1B:
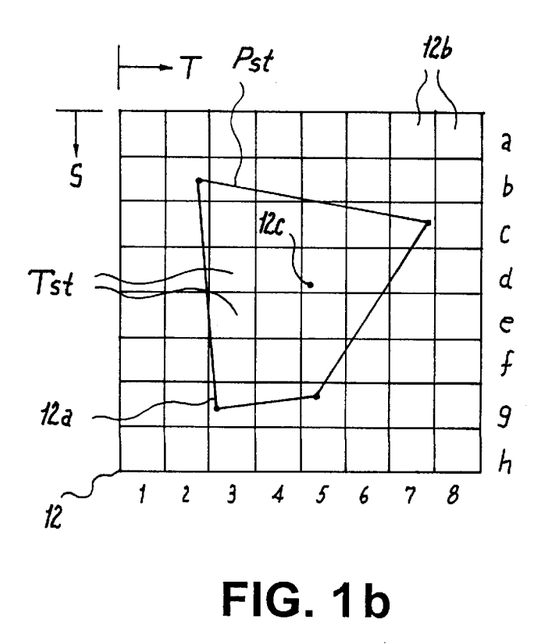
FIG. 1b is a plan view of a portion of texture space upon which the footprint of a square display-space pixel has been projected.

The texturing problem can be understood by reference to FIG. 1b, wherein the texel plane 12 is now orthogonal to the reader's sightline, so that the texels 12b of the array are rectangular, and preferably square, but the projected pixel $P_{st}$ footprint 12a has a distorted quadrilateral shape. I have selected the texture level-of-detail (LOD) such that the size of each texel is generally less than the size of the projected pixel $P_{st}$; thus, pixel 12a partially covers at least one texel $T_{st}$ and may completely cover one or more other texels $T'_{st}$. Here, the texel rows, in the S direction, have been labeled a through h, while the texel columns, in the T direction, have been labeled 1 through 8: the footprint 12a fully covers texels 3c, 4c, 3d, 4d, 5d, 4e, 5e and 4f, but only (possibly) portions of texels 2b, 3b, 4b, 5b, 2c, 7c, 3e, 6e, 3f, 5f, 6f, 3g, 4g and 5g, each of which texels may have a unique set of visual attributes, e.g., color/transparency values. The problem, as will be recognized by those skilled in this art, is to properly account for the contributions of all texels either partially-enclosed or fully-enclosed by the total area of particular pixel $P_{st}$ footprint 12a, in order to determine the proper color, translucency and the like visible attributes for display at the display space site of that pixel $P_{ij}$.

Figure 2:
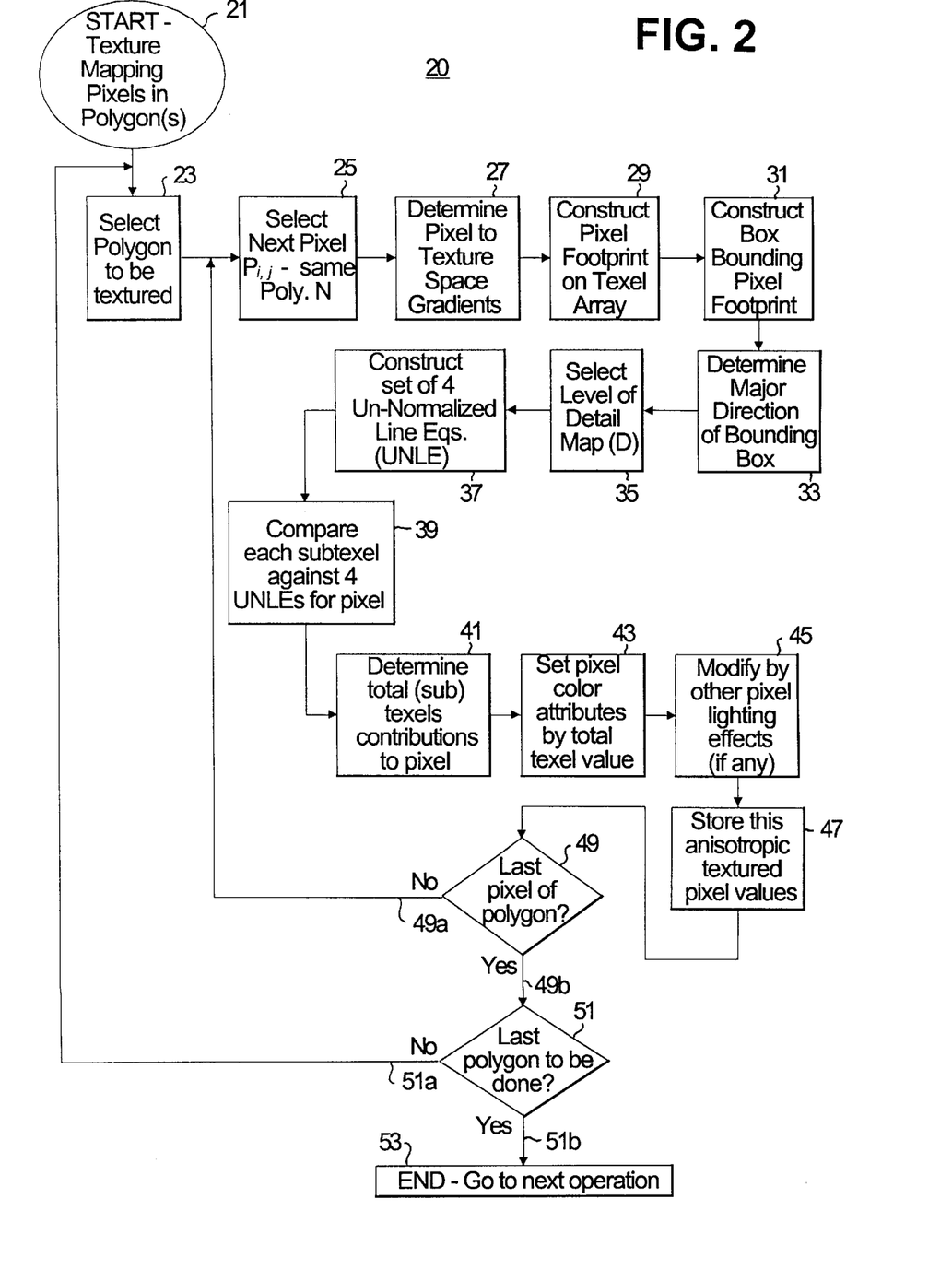
FIG. 2 is a flow diagram for one presently preferred embodiment of the methods of the present invention.
Figure 2A:
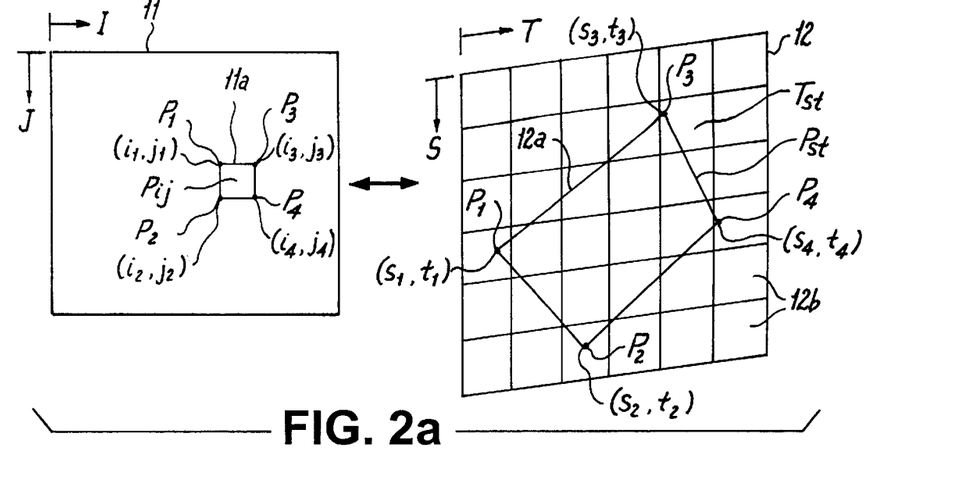
FIG. 2a is a side-by-side comparison of the display space screen and a pixel silhouette thereon, and a portion of the texture space array and the projected pixel footprint thereon.

Referring now to FIG. 2, in one presently preferred embodiment of my novel process, a 3D computer image generator (CIG) may have a graphics processor (which may be a dedicated hardwired logic engine or a software-programmed general computer) which carries out the isotropic-texturing silhouette/footprint analysis procedure shown in flow diagram 20. The process starts at step 21. Step 23 selects the next polygon 12 to be textured; in this embodiment, pixels may be grouped for each particular polygon to be rendered by the graphics engine, although other methods of pixel operation can equally as well be utilized. In step 25, procedure 20 selects the pair of I and J values of the next pixel $P_{ij}$ which is to be textured, in the presently-selected polygon N. This selection effectively determines both the image-space coordinates (i,j) of the pixel $P_{ij}$ corners and the corner coordinates (s,t) of that pixel $P_{st}$ as mapped into texture space. Referring also to FIG. 2a, a selected four-cornered quadrilateral pixel 11a has given corners $p_1$ through $p_4$, each with its associated I,J coordinates, i.e. $p_1$ is at (i1,j1), $p_2$ is at (i2,j2), $p_3$ is at (i3,j3) and $p_4$ is at (i4,j4). The display pixel $P_{ij}$ silhouette 11a is transformed to the texel space pixel $p_{st}$ footprint 12a, and each of the image space corners $p_{ij}$ is respectively transformed into an associated texture space corner $p_{st}$, i.e. $p_1$ is at (s1,t1), $p_2$ is at (s2,t2), $p_3$ is at (s3,t3) and $p_4$ is at (s4,t4).

Figure 2B:
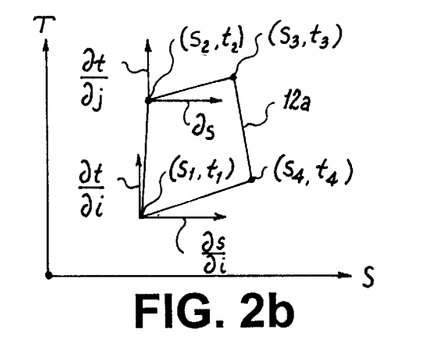
FIG. 2b is a view of texture space, with the projected pixel and some of its spatial derivatives, and useful in appreciation of several concepts needed for use of the methods of the present invention.

In step 27, the pixel-to-texel spatial gradients are determined and the pixel footprint is constructed on the texel array in step 29. As shown in FIG. 2b, the mapping gradients, from screen space to texture space, are found; the partial spatial derivatives $\partial s/\partial i$ and $\partial t/\partial i$ are found with respect to first corner (s1, t1) and partial spatial derivatives $\partial s/\partial j$ and $\partial t/\partial j$ are then found with respect to second corner (s2, t2). Given these partial derivatives, the (i,j) coordinates of each pixel $p_{(i,j)}$ can be mapped (which mapping is indicated by the→symbol) into texture space as $p_{(s,t)}$ i.e. p(i1,j1)→p(s1,t1); p(i2,j2)→p(s2,t2); p(i3,j3)→p(s3,t3); and p(i4,j4)→p(s4,t4). If the first corner (s1,t1) is found by the somewhat lengthy projection-transformation process, the other three corners can be found from a knowledge of the sidelengths in image space and the mapping gradients; for the usual situation, where each pixel has unit sidelengths acting as multipliers of the associated gradient terms, these other corner locations are:

$$(s2,t2)=(s1+\partial s/\partial i, t1+\partial t/\partial i),$$

$$(s3,t3)=(s2+\partial s/\partial j, t2+\partial t/\partial j), \text{ and}$$

$$(s4,t4)=(s1+\partial s/\partial j, t1+\partial t/\partial j)$$

The complete texture space pixel projected footprint 12a can be constructed by the ordered interconnection of these four corners.

Figure 2C:
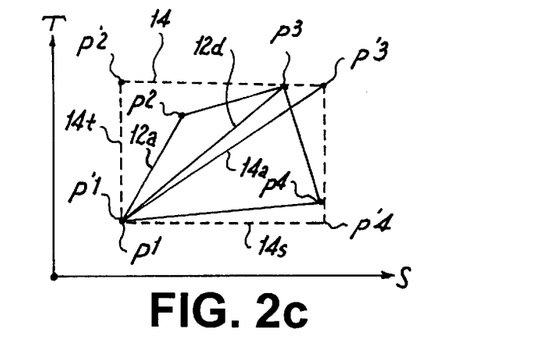
FIG. 2c is another view of texture space with the projected pixel, and of the bounding box added by the methods of the present invention.

Referring now also to FIG. 2c, step 31 is entered to compute a bounding BB box 14 which is a rectangular box just touching one of the corner points p at the greatest and least S values and at the greatest and least T values of the footprint, and thus encloses the pixel footprint 12a. Then, in step 33, there is calculated the bounding box main diagonal 14a, between the box 14 diagonally-opposed corner pair (here, corners p'1 and p'3) associated with, and closest to, the furthest-apart opposite corners (here, corners p1 and p3, which are further apart than opposite corners p2 and p4) forming a main diagonal 12d of the original footprint 12a; it will be seen that diagonal 14a is generally congruous to, but not identical with, the footprint main diagonal 12d. Since the bounding box 14 is determined by finding the maximum and minimum extents of the footprint in each of the S and T directions, the process of step 31 can specifically be:

$$S_{max}=\max(s1,s2,s3,s4) \text{ and}$$

$$S_{min}=\min(s1,s2,s3,s4)$$

$$\text{while } t_{max}=\max(t1,t2,t3,t4) \text{ and}$$

$$t_{min}=\min(t1,t2,t3,t4)$$

where max or min signify respectively the greatest or least one of the quantities within the following parentheses. Here, it is seen that $s_{max}$=s4 and $s_{min}$=s1, while $t_{max}$=t3 and $t_{min}$=t1. From the foregoing, the graphics processor can next calculate the box S range $R_s=(s_{max}-s_{min})$ or (s4−s1) and the box T range $R_t=(t_{max}-t_{min})$ or (t3−t1).

The major direction of the bounding box is determined, in step 33, by comparison of the maxima of the S extent and the T extent; the larger of range $R_s$ and range $R_t$ set the major direction $D_M$; or, $D_{max}=\max(R_s,R_t)$ and direction, $D_M=R_s$ if $D_{max}=R_s$ (i.e., if $R_s>R_t$), or $D_M=R_t$ if $D_{max}=R_t$ (i.e., if $R_t>R_s$).

Next, step 35 is entered and the proper LOD "D" is determined. To simplify the calculations, I have found that the quadrilateral footprint 12a can be approximated by a properly-sized parallelogram 12A with a minimum of visible error, if a plurality of texels 12b cover each projected pixel footprint 12a. I therefore want the pixel footprint bounding box 14 area to cover several texels in at least one box direction (FIG. 2d); it is preferable to cover a plurality in both axial directions, although projections with high aspect ratios may preclude this and allow plural texel coverage only along one axial direction. Note that my areal anisotropic methods want to have at least one texel, and preferably a greater number of texels, even in the "minor" direction, so as to truly have an area of coverage, rather than sampling coverage only along a line; if high aspect ratio footprints are routinely operated upon, use of the subtexel situation, discussed hereinbelow, is usually warranted, as this allows a second dimension to be used with an extent measured as a fraction of a texel, and allows a box 14 with a vanishing small minor dimension (less than one subtexel, as might be found by a polygon plane seen edge-on, at about 90°) to vanish. The number $T_s$ of texels 12b spanned by the S-axis side 14s of the box is calculated and compared to the calculated number $T_t$ of texels spanned by the T-axis side of box 14. The LOD number D can be varied to have a desired number in the vicinity of either $T_s$ or $T_t$; once a good value of D is found, the proper texture grid for that LOD is extracted from memory for use in the remaining steps. The texture grid placement dependents on whether the grid LOD is odd or even, which is a measure of the maximum number of texels spanning the pixel, as the finest resolution LOD D is set by examination of the number $T_D$ of the covered texels in one direction of the texel grid, as long as the condition $(T_D/2^D) \leq D_{max}$ is met. Typically, I try to have 3–5 texels span the pixel along the longer of its S and T ranges.

In step 37 (referring again to FIG. 2d), my methods determine whether a texel 12b is either inside the footprint (and therefore has its color and translucency attributes counted in the pixel 12a) or is outside of the footprint (and is not added to the incremental pixel attributes), by utilization of a set of four un-normalized line equations (UNLEs) L1–L4 for creating a coarse mapping to determine texel inclusion. Each of lines L1–L4 is represented by its own UNLE, which is used to determine the inclusion or exclusion of each texel, within the box 14, with respect to the footprint 12a; I sum the contributions of both whole (completely enclosed) and partial texels 12b to form the pixel footprint attributes.

Figure 2D:
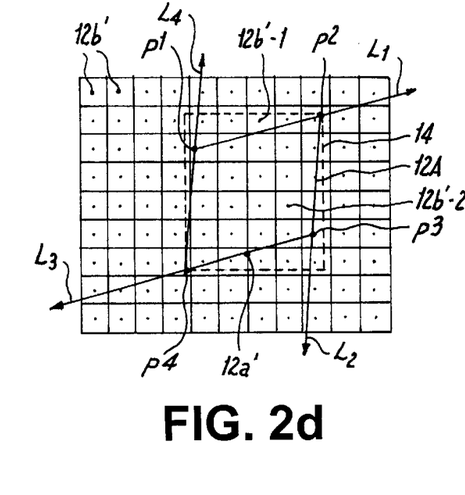
FIG. 2d is a view of a pixel footprint in texture space, showing the four bounding lines from which un-normalized line equations will be generated for use in the methods of the present invention.

Using an un-normalized line equation to determine the location of any point, and thus whether a texel should be part of the pixel footprint, operates by having the UNLEs determine which side of the line the point under investigation (say, the center 12b' of each texel) is on; if a perimeter point 12a' always travels around the footprint along a side-line L in a consistent direction (say, clockwise), then a point 12b' offset from the side-line L in a known direction (say, to the right of the line L) will be potentially within the pixel—testing the point 12b' with respect to all four side-lines L1–L4 will determine inclusion or exclusion.

Therefore, the first step in the UNLE process is to generate the four un-normalized line equations; I presently prefer a UNLE of the form $L=L_0+(L_s\times_A s)+(L_t\times_A t)$. For example, the first UNLE, given end points (s1,t1) and (s2,t2), has coefficients of $L_0=(s2\times t1)-(s1\times t2)$, $L_s=(t2-t1)$, and $L_t=(s1-s2)$. Each of the four UNLEs thus describes an edge of pixel footprint 12a. Each texel 12b can be tested to determine whether it is inside or out; this testing is eased if the footprint of a pixel in texel space is approximated by a parallelogram 12A, where each of the 4 sides of the parallelogram is a line described by an UNLE; the best-fit parallelogram 12A is usually one in a bounding box 14 having a major diagonal 14a close to the greater diagonal, between furthest opposed corners, of footprint 12a. Then, a point (say, a particular texel center 12b') is inside the footprint parallelogram 12A if all UNLEs yield a positive value for that point 12b'. A four-bit indicator word is associated with each point to be tested; each bit is set by the results of testing in the associated ordered UNLE (e.g., the word has bits WXYZ, where W is the sign of the first, or L1, UNLE test, X is the sign of the L2/second UNLE test for that same point, Y is the sign for the L3 UNLE test, and Z the fourth UNLE test result for line L4). If a particular one of the four UNLE tests is positive, one of the 4 bits associated with the point is set to 1, otherwise, a negative result generates a 0 bit; this process is done for each of the 4 line equations and those points with value of (1111 binary) or (15 decimal) are said to be inside the pixel footprint. For example, a first texel center point 12b'-1 has UNLE results of (--++) or binary 0011=3 decimal and is outside the footprint 12a, while another centerpoint 12b'-2 has UNLEs of (++++) or binary 1111, and is inside the modified footprint 12A.

The use of four UNLEs can be simplified to two UNLE equations if the pixel footprint 12a is forced to be a parallelogram 12A with two sets of spaced-apart parallel sides, having two sets of parallel line equations with the same coefficients. As previously mentioned, $$L=L_0+(L_s\times_\Delta s)+(L_t\times_\Delta t),$$

where, for a first point at (sa,ta) and another point at (sb,tb), $_\Delta s=sb-sa$ and $_\Delta t=tb-ta$; for (s1,t1) and (s2,t2) this becomes $L1=((s2\times t1)-(s1\times t2))+((s1-s2)\times_\Delta s)+((t2-t1)\times_\Delta t)$. A line L3 parallel to the above line L1 has (s1+a,t1+b) and (s2+a,t2+b), where a and b are offset constants. Thus, a parallel line would have a first term of $L'_0=(s2+a)\times(t1+b)-(s1+a)\times(t2+b)$; which is the same as $L'_0=L_0-(L_s\times a)-(L_t\times b)$; or $L'_0=L_0+k$; where $k=-(L_s\times a)-(L_t\times b)$. However, $L'_s=L_s$ and $L'_t=L_t$, so $L'=L+_A$, where $_A$ is the (a,b) offset.

In step 39, under raster-like uniform incrementation in both the "s" and "t" directions, the texels 12b enclosed in the footprint 12A can be found by using the UNLEs to determine the number of texel center points 12b' enclosed by the projected pixel footprint. If a binary word containing all 1's (i.e., $1111_2$) is calculated for a particular texel, that texel center is enclosed and the subject texel contributes toward the pixel attributes, otherwise the texel center is outside the footprint and the texel does not contribute to the tally. The graphics processor of the CIG may work from left to right, along each texel row (i.e., with changing s values passing through the entire required range) before incrementation of row number (i.e., change in the t value), calculating the new UNLE-based results for each of the texels: start in the upper left-hand corner of the bounding box 14 in texture space, calculate the full equation for each of the 4 UNLE to determine each texel centerpoint location relative to the footprint; the value of the next texel centerpoint to the right is calculated by saving the previous value for each equation and incrementing saved values by their associated $_\Delta s$; this incrementation process continues across the row; and the same subprocess is performed for each succeeding row, with incrementation of the associated $_\Delta t$ amounts, until all texels within the bounding box 14 are considered. The graphics attributes (e.g., number) of texels having their centerpoints 12b' enclosed in the footprint are processed (e.g., added) to obtain the textured pixel value.

Step 41 totals the center-enclosed texel contributions of all texels 12b that achieve a 1111-word result from the line equations, i.e., are turned "on", with a color/intensity contribution of 1, or else that texel is turned "off", with 0 (no) color/intensity contribution to the pixel total. It will be seen that the texturing effects of all texels having centers within the total area of the pixel projection footprint, are contributing to the pixel texturing, whether the projected pixel has a high aspect ratio (i.e., one of the width or length footprint dimension much less than the other dimension) or a low aspect ratio (i.e., substantially equal width and length of footprint 12a); this process will differentiate between a polygon at an angle of about $\tan^{-1}(2T)$, where T is the minimum number of texels in the LOD selected for the maximum axis of the footprint (the minimum critical dimension in the minor axial direction is the distance from edge to center, or about one-half the texel dimension, so that e.g., for an LOD yielding about 5 texels along the major axis of a particular footprint of an originally-square pixel, the aspect ratio will be about $\tan^{-1}(10)$ or about 84°).

Step 43 properly processes the step 41 total, as by averaging and the like chosen methodology, to set the pixel texture properties. This set of properties may be modified, in step 45, dependent upon any other factors present, such as differing pixel lighting effects and the like. The anisotropic textured pixel value for that pixel is stored, in the CIG frame buffer or a separate memory, in step 47. Step 49 is entered and a determination is made of the number of pixels remaining to be textured for that polygon N; if there are additional pixels, exit 49a is taken and step 25 reentered, whereupon the pixel number $p_{ij}$ is incremented; if no additional pixels exist for the present polygon, exit 49b goes to step 51. In step 51 the same sort of determination is made for additional polygons in the present scene; if additional polygon work is to be done, exit 51a returns the process to step 23; if not, exit 51b goes to step 53, which ends the texture process and passes the process to the next operation.

Figure 2E:
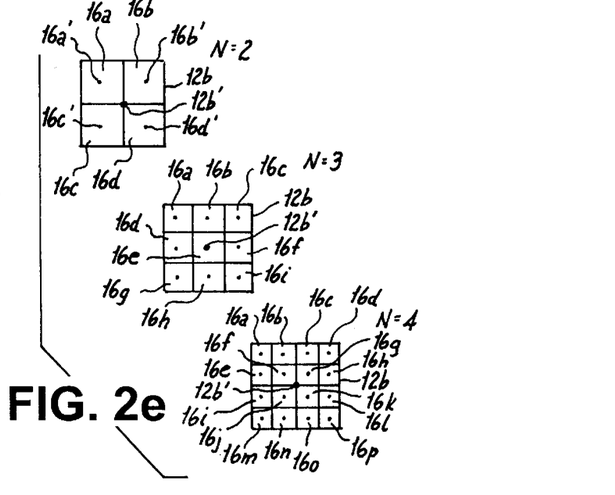
FIG. 2e is a set of subdivided texels, illustrating the use of 4, 9 or 16 subtexels for each texel to be processed, to generate better texture resolution.

Referring now to FIG. 2e, to improve the quality of the texturing process, each texel 12b may be subdivided into a plurality of subtexels 16; preferably, the division is into an equal number s of subdivisions along each of the S and T directions of each texel 12b, to generate $s^2$ subtexels 16, where s=2,3,4, . . . in the presently-considered texel 12b. Just as each texel 12b has its own centerpoint 12b', each subtexel 16 has its own centerpoint 16', used here for determination as to whether that subtexel is inside or outside the footprint 12a. Thus, I prefer to subdivide each texel into $s^2$ subtexels, where preferably s=2,3 or 4; if s=2, the texel is divided into 4 subtexels 16a–16d, while if s=3, there are 9 subtexels 16a–16i, and if s=4, there are 16 subtexels 16a–16p. It should be understood that s can be any integer number of subdivisions along each side of the texel, although a square subarray within the range of $2 \leq s \leq 4$ generally maximizes detail without unduly minimizing processing throughput (due to excessively long processing time for very large numbers of subtexels). It will also be seen that the maximum aspect angle of the underlying polygon can be almost 89° for a 4×4 subtexel array, using an LOD generating 5 texels in the major texture plane direction; a slightly greater aspect ratio, as provided by viewing the polygon 12 substantially in its plane (for an angle substantially equal to 90° with respect to the normal to the polygon plane, will cause the polygon to generate a substantially zero contribution to the displayed scenic image, which is desired, as a 90° aspect ratio causes the polygon to be seen "edge-on" and essentially disappear—no contribution should occur).

Each texel is weighted by the number of subtexels that are turned on, responsive to the same type of comparison against the signs of the four UNLEs. There will now be $s^2$ comparisons per pixel and $s^2$ sets of four-bit comparison words (WXYZ) to consider; if the comparison for any one subtexel is other than (1111), then that subtexel is not enclosed in the pixel footprint 12a and is not considered. Only if the subtexel comparison word is (1111) will the subtexel value be enclosed and counted in the pixel tally. Thus, for example in a 2×2 subdivided texel, if 1 subtexel is "on" (i.e., enclosed and to-be-counted), the texel value is ¼; if 2 subtexels are on, the texel value is ½; while if 3 subtexels are on, the texel value is ¾; and with all 4 subtexels being on, the value is, of course, 1 full texel's worth. This comparison is done in a modified step 39. Based on the number of subtexels enclosed in the footprint, the texel is assigned a weight that contributes to the texture color of the pixel being textured.

As previously mentioned, the LOD is preferably adjusted to provide a predetermined number of sequential texels along the major axis of the projected pixel footprint 12a. Occasionally, the bounding box main diagonal 14a decreases in size to be less than one texel length, even in the finest LOD, and an optional clamp may be invoked. This clamp will maintain the shape of the pixel footprint and its centroid. The pixel footprint is then sized (i.e., magnified) so that footprint 12a fills this clamped bounding box 14. Typically, this will happen when the viewpoint 10 moves very close to the texture polygon 12a and will keep the texture from becoming very blocky. Thus, if the maximum extent of the bounding box is smaller than a texel side in the finest LOD, magnify both the footprint and the bounding box until the maximum extent is the size of the texel, so as to clamp the pixel footprint to a minimum size of one texel and anti-alias the texel in close-in views.

Figure 3:
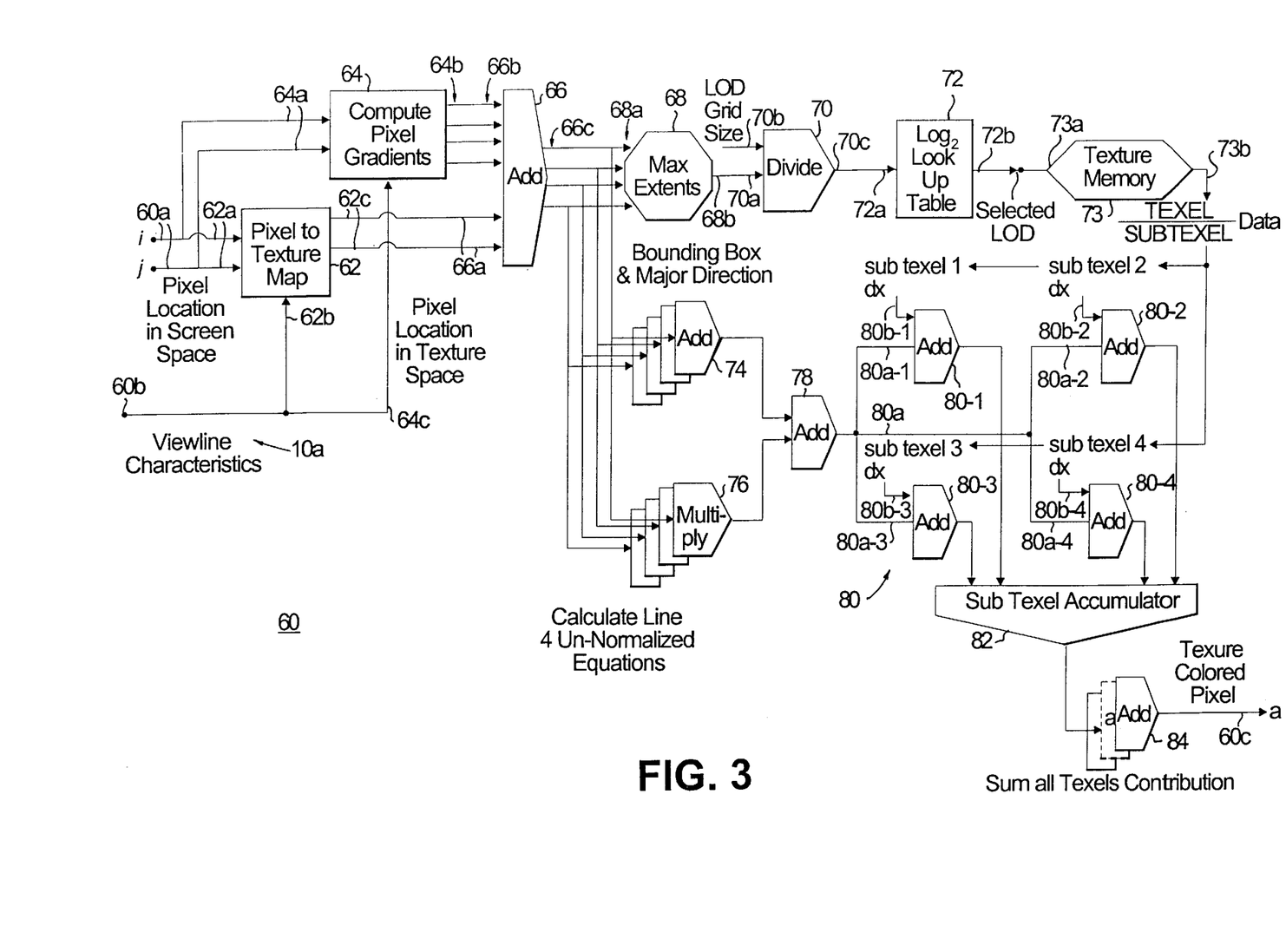
FIG. 3 is a schematic block diagram of one possible hardware implementation of the preferred method.

Referring now to FIG. 3, while this method can be carried out on a programmed general-purpose computer, which acts as the graphics processor, a dedicated computational machine 60 or ASIC may be equally as well provided to carry out the process and computations. Calculating the coefficients for each UNLE from 2 points requires the use of 2 digital multipliers and 3 digital adders. The precision of the arithmetic is a function of the grid size; integer arithmetic can be used.

The screen space pixel location $P_{ij}$ is provided at input means 60a, for passage both to an input 62a of a pixel-to-texture mapping means 62 and to an input 64a of a pixel gradient computational means 64. Means 62 has another set of inputs 62b receiving from input 60b data characterizing the viewline 10a (e.g., angles with respect to an observation space frame) so that a set of outputs 62c can provide data establishing the texture space footprint point $P_{st}$. The data at output 62c is coupled to a first set 66a of inputs to a first adder means 66, which has a second set 66b of four inputs receiving the four texel space gradients from the outputs 64b of means 64; means 64 may also receive the input 60b data at an input 64c, if required. The four adder means outputs 66c have the (s,t) coordinates of the four pixel footprint points p1–p4, respectively. From these footprint points, available to inputs 68a, a maximum extents subprocessor means 68 calculates $S_{max}$ and $T_{max}$ and the like, to determine the bounding box 14 and its major direction dimension 14a, which data are passed through output 68b to a first input 70a of a divider means 70. The LOD grid size information provided at input 70b is used as the divisor of major dimension values at input 70a, so that the number of texels covered along the major direction of the projected pixel footprint is provide at output 70c. This number is used as the address, at input 72a, of a $\log_2$ look-up-table means 72, which selects the LOD to be used, at output 72b, to an address input 73a of the graphics accelerator texture memory means 73. Means 73 outputs, at bus 73b, texel/subtexel content/attribute data.

Having determined the proper LOD, the bounding box corner point information at outputs 66c is provided to a set of adders 74 and multipliers 76 configured to provide partial terms of the UNLEs. Their outputs are fed to another adder means 78 to calculate the four UNLEs. These are provided to a first set of inputs 80a of a comparator means 80 and are compared to the texel/subtexel data from texture memory means 73 output 73b, appearing at another set of comparator means inputs 80b; if the texel 12b has been divided up into Q subtexels 16, each of the Q different subtexels (here, a 2×2 array of Q=4 subtexels) are each compared to the UNLEs by a different one of a set of a comparison means here a quad of means 80-1 through 80-4. If the subtexel 16x, where x=a, b, c or d, respectively, UNLE word is $15_H$ then the color attribute data for that subtexel is entered into the subtexel accumulator means 82; after all Q subtexels are considered, the accumulator means output 82a has data for that one texel then being processed. This data is passed to the 'sum all texels' accumulator means 84, which provides the total texel contributional data for the pixel presently being projected, to output 60b. The pixel data at output 60b can be further processed or entered directly into storage in a frame buffer and the like, for raster (or other) scanning to the CIG display means and viewing by observer 10.

While one presently preferred embodiment of my novel methods and apparatus for anisotropic texture mapping by silhouette analysis has been described in detail herein, many variations and modifications will now become apparent to those skilled in the art. It is my intention to therefore be limited only by the scope of the appending claims, and not by way of details or instrumentalities set forth herein by way of explanation.

What I claim is:

1. An anisotropic mapping method for determining the textural attributes of each of plural pixels of at least one polygon in a scene to be displayed by a computer image generator, including the steps of:

(a) for each pixel, projecting a display space silhouette of that pixel as a footprint onto at least one texel of a texture pattern in texture space, constructing the pixel footprint as a quadrilateral on an array of texels of the texture pattern; constructing a box in texture space bounding the footprint; and determining a bounding box major direction;

(b) adjusting a level-of-detail (LOD) of the texels texturing the at least one polygon, to cause that projected pixel footprint to cover at least a predetermined number of texels in a selected direction of texture space;

(c) defining the footprint in texture space by a set of line equations and determining the accumulated number of full and partial texels covering the total anisotropic area of that footprint in relation to the line equations;

(d) determining the visual attributes for that pixel from the total texels accumulated therefore; and (e) storing the determined visual attributes information for that pixel, to facilitate pixel display in its associated scene.

2. The method of claim 1, wherein substep (a3) includes the step of aligning the box major direction with the further-apart pair of opposed corners of the footprint.

3. The method of claim 2, wherein substep (a2) includes the step of approximating the footprint by a parallelogram.

4. The method of claim 3, wherein the parallelogram diagonal closest to the further-apart footprint diagonal is selected as the box major direction.

5. The method of claim 1, wherein step (c) includes the substeps of: (c1) constructing a set of un-normalized line equations (UNLEs) to characterize the footprint in texture space; (c2) determining, by use of the set of UNLEs, the direction of a center of each texel within the bounding box; and (c3) including in the footprint total only those texels having a center with a predetermined relationship to all UNLEs of the set.

6. The method of claim 5, wherein a set of gradients for two-dimensional transformation of the image space into the texture space, are used for construction of the UNLEs.

7. The method of claim 6, wherein step (a) includes the substeps of: (a1) constructing the pixel footprint as a quadrilateral on an array of texels covering the at least one polygon; (a2) constructing a box in texture space bounding the footprint; and (a3) determining a bounding box major direction.

8. The method of claim 7, wherein substep (a3) includes the step of aligning the box major direction with the further-apart pair of opposed corners of the footprint.

9. The method of claim 8, wherein substep (a2) includes the step of approximating the footprint by a parallelogram.

10. The method of claim 9, wherein the parallelogram diagonal closest to the further-apart footprint diagonal is selected as the box major direction.

11. The method of claim 5, further included the steps of: traversing the UNLEs in a preselected direction about the perimeter of the footprint; and including a texel in the total area only if the UNLE results for that texel are all of like selected result.

12. The method of claim 1, wherein each texel is divided into a plurality of subtexels, and all of steps (b)–(d) are carried out for each subtexel.

13. The method of claim 12, wherein step (b) further including the step of selecting the LOD to cause at least 5 texels to cover the pixel footprint in the selected direction.

14. A computer graphics acceleration method for selecting texel data, organized into plural levels-of-details (LODs), for use in display of image space pixels, comprising the steps of:
defining a scene by objects visible therein to an observer, each object being defined by at least one polygon appearing in texture space and overlaid by a collection of texels;
defining a footprint of a display pixel silhouette projected onto the textured object;
defining a bounding box to cover the entire area of the projected pixel footprint;
selecting a LOD for the texels, to cause a desired number of texels to lie along a main diagonal of the bounding box; and
determining the total of all texels within the bounding box having a selected geometric location lying within the footprint and contributing to the displayable attributes of the pixel.

15. The method of claim 14, wherein each texel is subdivided into a plurality of subtexels, and further including the step of determining subpixels as contributing to the visible attributes of the pixel if the selected geometric location of a subtexel lies within the footprint.

16. The method of claim 15, wherein the selected geometric location is the center of the subtexel being tested for inclusion in the contributing set.

17. The method of claim 14, wherein the selected geometric location is the center of the texel being tested for inclusion in the contributing set.

18. The method of claim 14, wherein plural un-normalized line equations are compared to the selected location to determine inclusion of the associated texel in the contributing set.

19. Apparatus for anisotropic mapping to determine textural attributes of each of plural pixels of at least one polygon in a scene to be displayed by a computer image generator, comprising:
means for receiving a designation of an image-space pixel then being processed, and for mapping a footprint of that pixel onto at least one texel of a texture pattern in texture space, constructing the pixel footprint as a quadrilateral on an array of texels of the texture pattern; constructing a box in texture space bounding the footprint; and determining a bounding box major direction;
means for adjusting a level-of-detail (LOD) of the texels texturing said at least one polygon to cause that pixel footprint to cover at least a predetermined number of texels in a selected direction of texture space;
means for defining the footprint in texture space by a set of line equations;
means for determining the accumulated number of full and partial texels covering the total anisotropic area of that footprint in relation to the line equations;
means for determining the visual attributes for that pixel from the total texels accumulated therefore; and
means for storing the determined visual attributes information for that pixel, to facilitate pixel display in its associated scene.

20. Apparatus for anisotropic mapping to determine textural attributes of each of plural pixels in a scene to be displayed by a computer image generator, comprising:
means for receiving a designation of an image-space pixel then being processed, and for mapping a footprint of that pixel onto at least one associated object polygon in texture space, the means for mapping including means for constructing the pixel footprint as a quadrilateral on an array of texels covering the at least one polygon, means for constructing a box in texture space bounding the footprint and means for determining a bounding box major direction;
means for adjusting a level-of-detail (LOD) of the texels texturing said at least one polygon to cause that pixel footprint to cover at least a predetermined number of texels in a selected direction of texture space;
means for defining the footprint in texture space by a set of line equations;
means for determining the accumulated number of full and partial texels covering the total anisotropic area of that footprint in relation to the line equations;
means for determining the visual attributes for said pixel from the total texels accumulated therefore; and
means for storing the determined visual attributes information for that pixel, to facilitate pixel display in its associated scene.

21. The apparatus of claim 20, wherein the means for determining the accumulated number of full and partial texels includes:
(a) means for constructing a set of unnormalized line equations (UNLE's) to characterize the footprint in texture space;
(b) means for determining by use of the set of UNLE's the direction of a center of each texel within the bounding box; and (c) means for including in the footprint total only those texels having a center with a predetermined relationship to all UNLE's of the set.

22. The apparatus of claim 20, wherein said means for constructing a box in texture space bounding the footprint includes means for approximating the footprint by a parallelogram.

23. An anisotropic mapping method for determining the textural attributes of each of plural pixels in a scene to be displayed by a computer image generator, including the steps of:

(a) for each pixel, projecting a display space silhouette of that pixel as a footprint onto at least one associated object polygon in texture space, the pixel footprint being constructed as a quadrilateral on an array of texels covering the at least one polygon, constructing a box in texture space bounding the footprint, and determining a bounding box major direction;

(b) adjusting a level-of-detail (LOD) of the texels texturing the at least one polygon, to cause that projected pixel footprint to cover at least a predetermined number of texels in a selected direction of texture space;

(c) defining the footprint in texture space by a set of line equations and determining the accumulated number of full and partial texels covering the total anisotropic area of that footprint in relation to the line equations;

(d) determining the visual attributes for that pixel from the total texels accumulated therefore; and (e) storing the determined visual attributes information for that pixel, to facilitate pixel display in its associated scene.

24. The method of claim 23, wherein step (a) includes the step of approximating the footprint by a parallelogram.

* * * * *